(12) United States Patent
Ishida et al.

(10) Patent No.: US 7,205,519 B2
(45) Date of Patent: Apr. 17, 2007

(54) CONFOCAL MICROSCOPE DISPLAY DEVICE FOR DISPLAYING A PLURALITY OF SLICE IMAGES

(75) Inventors: Hideyuki Ishida, Hadano (JP); Takeo Tanaami, Musashino (JP)

(73) Assignees: Tokai University Educational System, Tokyo (JP); Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 11/403,833

(22) Filed: Apr. 14, 2006

(65) Prior Publication Data

US 2006/0192076 A1 Aug. 31, 2006

Related U.S. Application Data

(62) Division of application No. 10/853,355, filed on May 26, 2004.

(30) Foreign Application Priority Data

Dec. 3, 2002 (JP) ............................. 2002-351577
May 27, 2003 (JP) ............................. 2003-149125

(51) Int. Cl.
G02B 7/04 (2006.01)
G02B 21/00 (2006.01)
G06K 9/00 (2006.01)

(52) U.S. Cl. ............................. 250/201.3; 250/201.2; 250/201.4; 382/154; 359/383

(58) Field of Classification Search .. 250/201.2–201.4; 382/131, 154; 359/383
See application file for complete search history.

(56) References Cited

U.S. PATENT DOCUMENTS 6,151,404 A * 11/2000 Pieper ........................ 382/128
6,160,908 A * 12/2000 Hakozaki ..................... 382/154
6,437,910 B1 * 8/2002 Watanabe .................... 359/368
2002/0171751 A1 11/2002 Ohkawara

FOREIGN PATENT DOCUMENTS

JP 2002-72102 A 3/2002

OTHER PUBLICATIONS

Akira Ichihara et al., High-Speed Confocal Fluorescence Microscopy Using a Nipkow Scanner with Microlenses for 3-D Imaging of Single Fluorescent Molecule in Real Time, Bioimages 4(2): 57-62, Jun. 1996.

* cited by examiner

*Primary Examiner*—Thanh X. Luu
*Assistant Examiner*—Brian Livedalen
(74) *Attorney, Agent, or Firm*—Westerman, Hattori, Daniels & Adrian, LLP.

(57) ABSTRACT

A confocal microscope apparatus has a confocal scanner for scanning a sample with shifting a focal position of a light beam in a direction perpendicular to an optical axis, a moving mechanism for moving the focal position of the light beam in an optical axis direction, a camera for picking up an image of the sample with the light beam, and a movement control unit for controlling the moving mechanism to move the focal position of the light beam by a predetermined distance in the optical axis direction for every vertical synchronizing signal of the camera in synchronization with the vertical synchronizing signal. A high-speed three-dimensional image can be displayed in such that while measuring the sample, two or more slice images in such an arrangement on a common screen that their positions relative to the sample enables to be grasped.

7 Claims, 10 Drawing Sheets

FIG. 3A TRIGER
FIG. 3B VERTICAL SYNCHRONIZING SIGNAL (VSYNC)
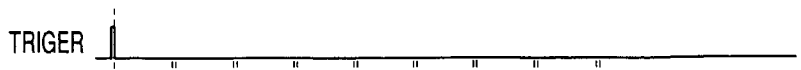
FIG. 3C MOVEMENT CONTROL SIGNAL (CNT)
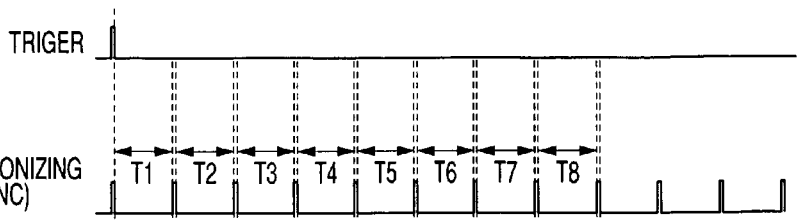
FIG. 3D RESET SIGNA (RST)
FIG. 3E DRIVE SIGNAL
FIG. 3F VERTICAL SYNCHRONIZING SIGNAL (VSYNC)
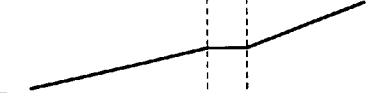
DRIVE SIGNAL
FIG. 3G
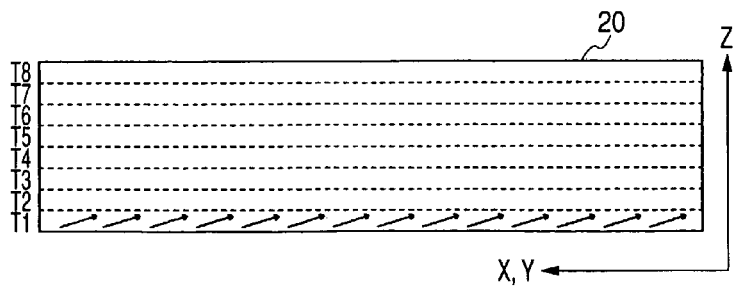

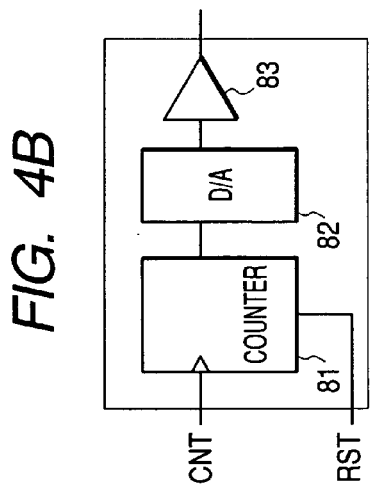
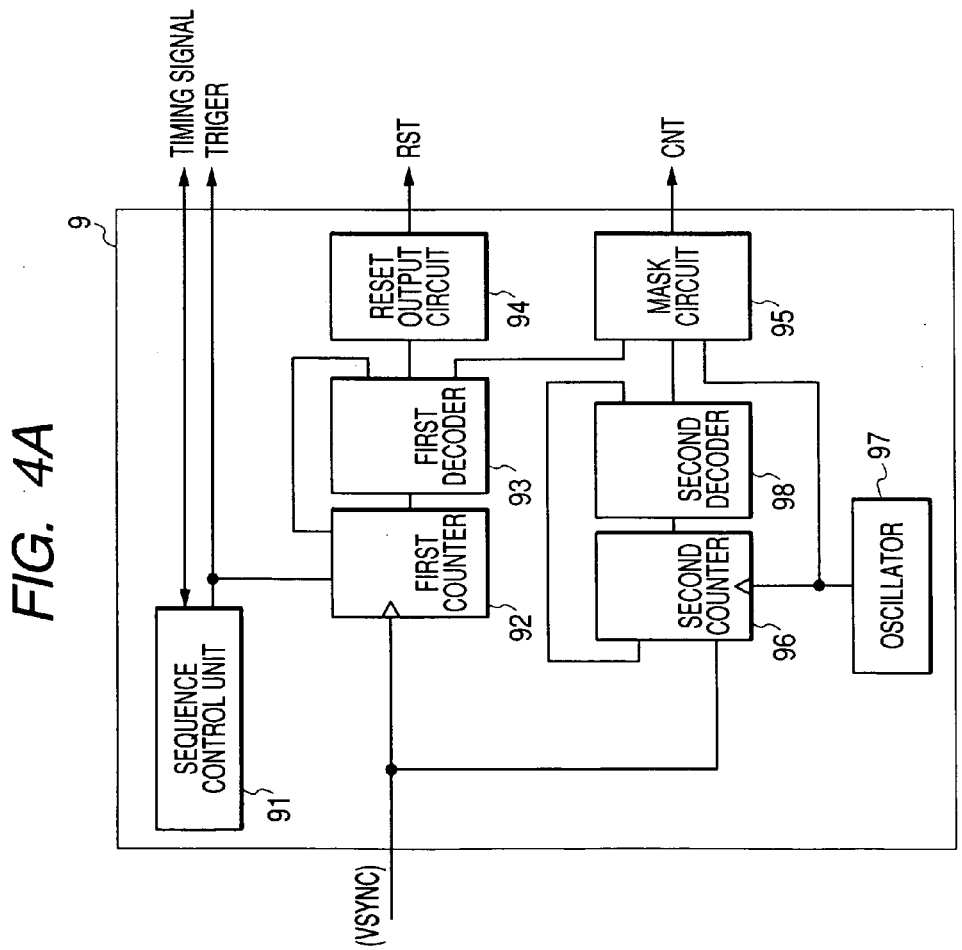

FIG. 5A TRIGER

FIG. 5B VERTICAL SYNCHRONIZING SIGNAL (VSYNC)  T1 T2 T3 T4 T5 T6 T7 T8

FIG. 5C MOVEMENT CONTROL SIGNAL (CNT)

FIG. 5D RESET SIGNAL (RST)

FIG. 5E DRIVE SIGNAL

FIG. 5F VERTICAL SYNCHRONIZING SIGNAL (VSYNC)

DRIVE SIGNAL (1) (2)
(3) (4)

(1)
(2)
(3)
(4)

CONFOCAL MICROSCOPE DISPLAY DEVICE FOR DISPLAYING A PLURALITY OF SLICE IMAGES

This application is a divisional of prior U.S. application Ser. No.: 10/853,355 filed May 26, 2004, the benefit of which is claimed under 35 U.S.C. §120.

BACKGROUND OF THE INVENTION

1. Field of the Invention

The present invention relates to a confocal microscope, which is enabled to measure a stereoscopic shape of a sample by combining an optical microscope and a confocal optical scanner.

2. Description of the Related Art

For example, a Nipkow's disc type confocal microscope apparatus, as shown in FIG. 1A, is well known in the related art. This confocal microscope apparatus is provided with: a microlens array 101, a pinhole array 102 (i.e., Nipkow's disc) and an objective lens 103 for condensing a laser light onto a sample 20; an actuator 104 for moving the objective lens 103 in an optical axis direction (or in a Z-direction, as shown); a camera 106 having a condensing lens 105; and a beam splitter 107 for changing the path of the reflected light coming from the sample through the objective lens 103 and the pinhole array 102, in the direction to the camera 106.

In the configuration, the Z-coordinate of the focused point of the laser light is controlled depending on the position of the objective lens 103 in the Z-direction, and the XY-coordinates of the focused point of the laser light is controlled by turning the microlens array 101 and the pinhole array 102. In other words, the scanning point in the sample 20 to be picked up by the camera 106 can be three-dimensionally controlled depending on the Z-direction position of the objective lens 103 and the turning angles of the microlens array 101 and the pinhole array 102.

In the such a scanning technique of the confocal microscope apparatus, the operations to move the objective lens 103 uniformly in a Z-coordinate increasing direction for a longer period than a plurality of frame periods are started in synchronization with a vertical synchronizing signal of the camera, as produced just after the input of a trigger signal, while turning the microlens array 101 and the pinhole array 102 in synchronization with the vertical synchronizing signal of the camera 106. This scanning technique is described, for example, in JP-A-2002-72102.

In the scanning technique, however, the timing for starting the movement of the objective lens 103 is synchronized with the vertical synchronizing signal, but the movement after the start is performed asynchronously of the vertical synchronizing signal. As a result, it is difficult to control the Z-direction position of the scanning point highly precisely for the individual video frames to be picked up by the camera 106. In the case of the repeated capturing with the movement of the Z-direction position, more specifically, the discrepancy of the Z-direction position is so cumulatively enlarged that the discrepancy can be neither confirmed nor corrected.

In the related art described above, moreover, the individual scanning points are captured by scanning in the XY-directions while changing the Z-coordinate at all times. According to the capturing method by thus changing the Z-coordinate at all times, moreover, the Z-coordinate point can be prevented from being unscanned for all the XY-coordinates so that even a micro structure in the Z-direction can enhance the probability of its appearance at least in the captured images.

In the related art, the coordinates of the objective lens 103 change uniformly, too, even for the time period of the synchronizing signal such as the vertical synchronizing signal, when the capturing is not done in the camera 106. However, that Z-coordinate range in the sample 20, which corresponds to the range for the objective lens 103 to have moved for the synchronizing signal period, is not captured in the least. According to the related art, therefore, a micro structure in the Z-direction may drop out.

Depending on the application of the confocal microscope apparatus, on the other hand, the video frames having picked up the XY-plane of the sample with the Z-coordinate being fixed may be desirably produced individually for the different Z-coordinates. For example, a set of video frames thus produced become as they are the voxels having the XYZ-coordinate system so that they are suited for the processing such as the three-dimensional analysis of the sample 20.

According to the related art thus far described, however, the Z-coordinate always changes, too, for the video pickup period of the camera 106 so that the video frames having picked up the XY-plane of the sample with the Z-coordinate being fixed cannot be produced.

SUMMARY OF THE INVENTION

An object of the invention is to provide a confocal microscope apparatus that improves the precision of the scanning position control of a sample in the optical axis direction.

Another object of the invention is to provide a confocal microscope apparatus that enhances the probability of grasping a micro structure in an image picked up.

A further object of the invention is to provide a confocal microscope apparatus that creates video frames captured by picking up a plane normal to the optical axis of a sample with the coordinate in the optical axis direction being fixed, individually for the coordinates in the different optical axis directions.

A further object of the invention is to provide a confocal microscope apparatus that creates video frames captured by picking up a plane normal to the optical axis of the sample with the coordinate in the optical axis direction being fixed, individually for the coordinates in the different optical axis directions, and to display a three-dimensional image at a high speed, thereby to grasp the whole image while measuring a sample.

A further object of the invention is to provide a confocal microscope apparatus that grasps slice images in each section and their stereoscopic relations precisely.

BRIEF DESCRIPTION OF THE DRAWINGS

FIGS. 3A to 3G are diagrams showing a scanning sequence according to the embodiment of the invention;

FIGS. 4A and 4B are block diagrams showing examples of the configurations of a Z-axis scan control device and an actuator according to the embodiment of the invention;

FIGS. 5A to 5G are diagrams showing another scanning sequence according to the embodiment of the invention;

DETAILED DESCRIPTION OF THE PREFERRED EMBODIMENTS

Figure 1A:
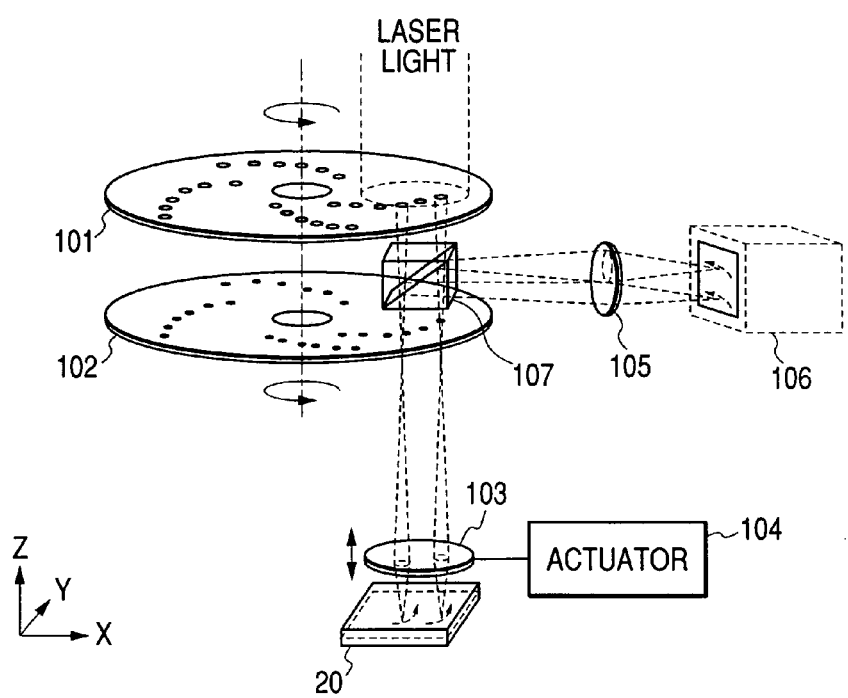
FIGS. 1A and 1B are diagrams showing a configuration and a scanning sequence of a confocal microscope apparatus of the related art.
Figure 1B:
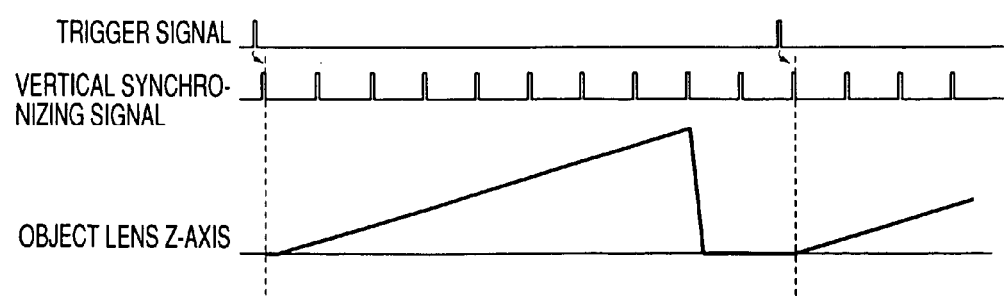
Figure 2:
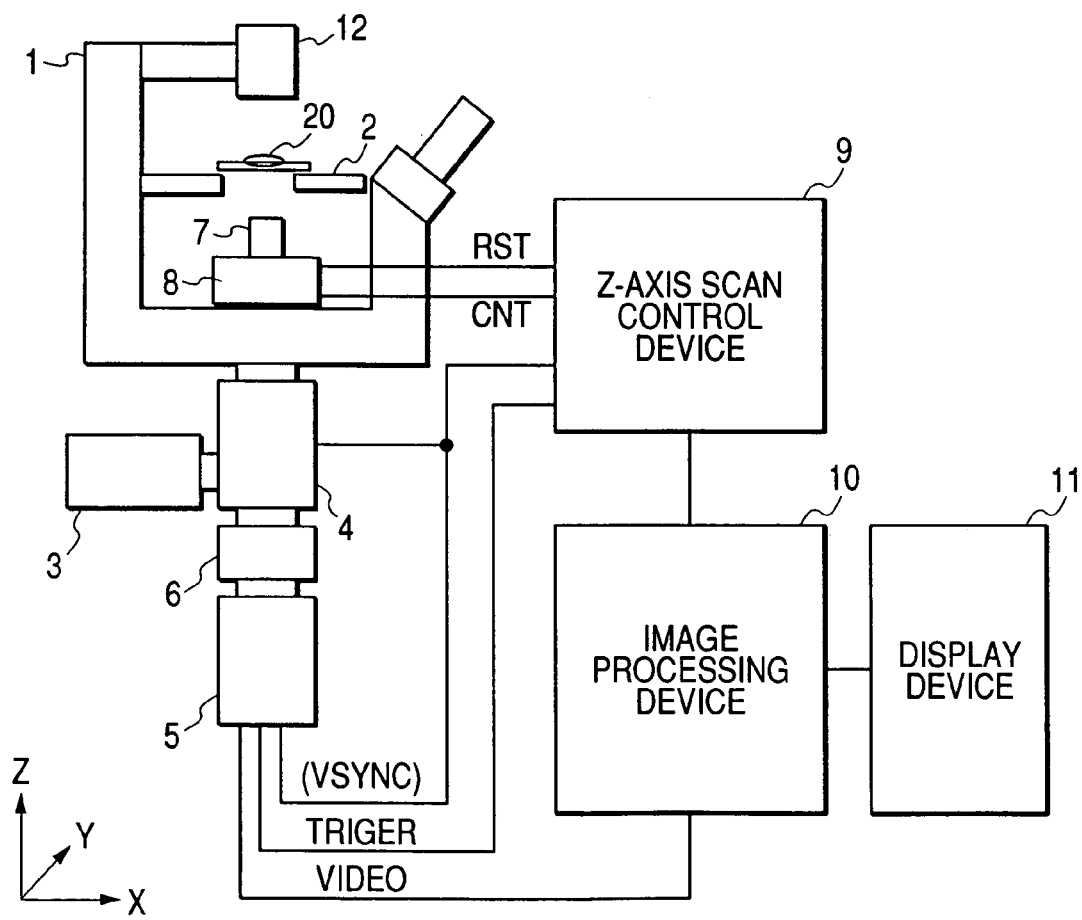
FIG. 2 is a schematic diagram showing a configuration of a confocal microscope apparatus according to an embodiment of the invention.

The invention will be described in detail with reference to the accompanying drawings. FIG. 2 is a configuration diagram showing one embodiment of a confocal microscope apparatus according to the invention.

As shown in FIG. 2, the confocal microscope apparatus is provided with: a body portion 1; a stage 2 for mounting a sample 20; a laser light source 3; a confocal scanner unit 4; a high-speed camera 5 such as a double-speed camera of 66 frames/second adopting IEEE 1394 as the communication standards; an image intensifier 6 for adding an image intensifying function, a high-speed shutter function and so on to that camera 5; an objective lens 7; an actuator 8 for moving the objective lens 7 in the direction of an optical axis; a Z-axis scan control device 9; an image processing device 10 constructed of a computer or the like having a video capture interface; and a display device 11. In the confocal scanner unit 4, moreover, there are housed the microlens array, the pinhole array, the beam splitter, as has been described hereinbefore, and the rotation control unit for rotationally driving the microlens array and the pinhole array.

The present confocal microscope apparatus is further provided with an illuminating light source 12 so that it also functions as an optical microscope apparatus with the illuminating light source 12 and the optical system housed in the body portion 1.

The scan control in the present confocal microscope apparatus will be described below. FIGS. 3A to 3G show a scanning sequence of the confocal microscope apparatus. The scanning sequence is started with a TRIGER signal outputted from the Z-axis scan control device 9. In response to the TRIGER signal as an external trigger signal, the camera 5 synchronizes a vertical synchronizing signal with the TRIGER signal, as shown in FIG. 3B, to start the capturing.

On the other hand, the vertical synchronizing signal VSYNC of the camera 5 is outputted to the confocal scanner unit 4 and the Z-axis scan control device 9. In synchronization with the vertical synchronizing signal VSYNC inputted, the (not-shown) rotation control unit of the confocal scanner unit 4 drives the microlens array and the pinhole array so rotationally as to scan the whole XY-area once for every image pickup periods of the individual video frames. Here, the image pickup period portion such a period in one video frame period as excludes at least the vertical synchronizing signal period. Moreover, the image pickup period may exclude a horizontal synchronizing signal period and the period, for which the pixels before and after the horizontal synchronizing signal period and the vertical synchronizing signal period.

In synchronization with the vertical synchronizing signal VSYNC inputted, as shown in FIG. 3C, the Z-axis scan control device 9 outputs a predetermined number of pulses of a predetermined period in the image pickup period of each video frame, as a movement control signal CNT to the actuator 8. Moreover, the Z-axis scan control device 9 counts the vertical synchronizing signals VSYNC inputted, and stops the pulse output when a predetermined count is reached. The Z-axis scan control device 9 executes a stage, at which it outputs a reset signal RST to the actuator 8, as shown in FIG. 3D. When the next vertical synchronizing signal VSYNC is inputted, the Z-axis scan control device 9 repeats such a sequence like before for the period of a predetermined number of video frames as is composed of the stage, at which it outputs the pulses of a predetermined number of predetermined periods as the movement control signal CNT to the actuator 8, and the stage, at which it stops the pulse output for one video frame period and at which it outputs the reset signal RST to the actuator 8.

On the other hand, the actuator 8 integrates the pulses of the movement control signal CNT inputted from the Z-axis scan control device 9, to produce the drive signals which keep constant values for the periods of the vertical synchronizing signals VSYNC but uniformly increase for the image pickup periods of the video frames, as shown in FIGS. 3E and 3F. The objective lens 7 is moved in the Z-direction with those drive signals. Here, the movement of the objective lens 7 is made proportional to the magnitudes of the drive signals. If the movement of the objective lens 7 is not linearly proportional to the magnitudes of the drive signals, the drive signals are produced to have such a waveform as to move the objective lens 7 not for the periods of the vertical synchronizing signals VSYNC but uniformly for the image pickup periods of the video frames. Here, the mechanism for moving the objective lens 7 can be exemplified by one using a piezo-element.

In response to the reset signal RST from the Z-axis scan control device 9, moreover, the actuator 8 returns the drive signals to the initial value.

By the operations thus far described, the scanning points in the sample 20 and the individual video frames are given such relations as are shown in FIG. 3G. For the individual video frame periods (as indicated by T1 to T8), the images in the different Z-axis ranges are picked up for every video frame periods. In this embodiment, the objective lens 7 is moved in the Z-direction only for the image pickup periods of the video frames. For any of the XY-coordinates, therefore, there hardly occurs a Z-coordinate range of no capturing.

Reverting to FIG. 2, the image processing device 10 repeats the operations to fetch and store the individual video frames VIDEO outputted from the camera 5 and to synthesize and display them in the display device 11. Here, the image processing device 10 is fed with timing signals indicating the timings of the TRIGER signals, from the Z-axis scan control device 9. In accordance with these timing signals, the image processing device 10 repeats the operations: to recognize the correspondences between the individual video frames and the orders of the samples 20 picked up in the video frames, in the Z-direction of the scanning face; to synthesize and arrange the individual video frames in accordance with the recognized orders thereby to reconstruct the three-dimensional images (or voxels) of the samples 20; and to display such a three-dimensionally expressed image in the display device 11 that the three-dimensional image is projected on a virtual two-dimensional screen by a suitable rendering algorithm (e.g., a volume rendering). In short, the image processing device 10 makes a real time display of the three-dimensionally expressed image of the sample 20.

One configuration example of the Z-axis scan control device 9 will be described in the following. FIGS. 4A and 4B shows the configuration example of the Z-axis scan control device 9. The following description is made by assuming that the Z-axis scan control device 9 repeats such a sequence in the scanning sequence shown in FIGS. 3A to 3G as is composed of the stage, at which the Z-axis scan control device 9 outputs a predetermined number M of pulses of a predetermined period T as the movement control signal CNT to the actuator for the image pickup period of each vide frame in a predetermined number N of video frame periods, and the stage, at which the Z-axis scan control device 9 stops the pulse output for one video frame period and outputs the reset signal RST to the actuator 8.

In FIGS. 4A and 4B, a sequence control unit 91 generates the aforementioned TRIGER signal in response to a demand from the image processing device 10, the user's operation or the like.

A first counter 92 is reset with the TRIGER signal to count the vertical synchronizing signals VSYNC from 0. A first decoder 93 decodes the counted value of the first counter 92. When this counted value reaches the predetermined value N, the first decoder 93 outputs a reset enable signal to a reset output circuit 94 and a mask circuit 95, and outputs a counter reset signal to the first counter 92. The reset output circuit 94 produces, when fed with the reset enable signal, the reset signal RST of a predetermined pulse length, and outputs the reset signal RST to the actuator 8. When the first counter 92 is fed with a counter reset signal, on the other hand, it is reset to 0 in synchronization with the input of the next vertical synchronizing signal VSYNC.

A second counter 96 counts clock signals of the predetermined period T outputted by an oscillator 97, from 0. A second decoder 98 decodes the counted value. When this counted value becomes M, the second decoder 98 outputs a pulse mask signal to the mask circuit 95 and outputs a stop signal to the second counter 96. Only for the time period while the reset enable signal is not outputted from the first decoder 93 and while the pulse mask signal is not outputted from the second decoder 98, the mask circuit 95 outputs the clock signal of the predetermined period T outputted from the oscillator 97, as the pulse of the movement control signal CNT to the actuator 8. Here, the second counter 96 stops the counting operation, when fed with the stop signal, until the vertical synchronizing signal VSYNC is inputted. When the vertical synchronizing signal VSYNC is inputted, the second counter 96 resets the count value to 0, and starts the counting operation.

The foregoing configuration of the Z-axis scan control device 9 is just one example, and can adopt another. In a configuration, for example, a PLL can be used to produce a pulse signal of a 1/M period having an image pickup period synchronized with the vertical synchronizing signal, and this pulse signal can be outputted as the movement control signal CNT only for the image pickup period. Alternatively, the Z-axis scan control device 9 may also be constructed as a CPU circuit so that the foregoing operations of the Z-axis scan control device 9 may be executed in the software manner.

Next, the drive signal is produced in the actuator 8 by integrating the pulses of the movement control signal CNT inputted from the Z-axis scan control device 9, as has been described hereinbefore. This integration may be made by the well-known analog integration circuit. Another analog integration circuit can be constructed, as shown in FIG. 4B, to include: a counter 81 for counting the pulses of the movement control signal CNT; a D/A converter 82 for D/A converting the counted value of the counter 81; and a driver circuit for amplifying the output of the D/A converter 82. Here, the counter 81 is reset with the reset signal RST inputted from the Z-axis scan control device 9.

Now, the confocal microscope apparatus of the embodiment thus far described may further execute the following scanning sequence.

Figure 5G:
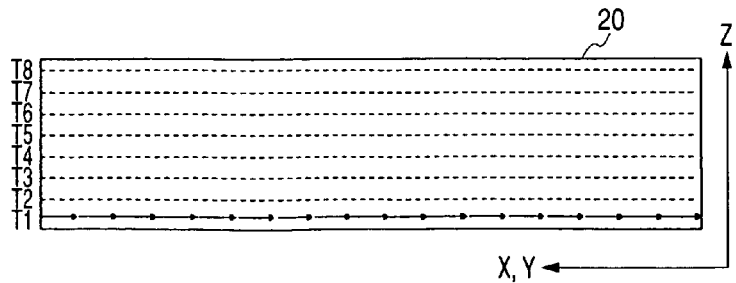

As shown in FIGS. 5A to 5G, the scanning sequence is started with the TRIGER signal, as shown in FIG. 5A, which is outputted by the Z-axis scan control device 9. The camera 5 receives the TRIGER signal as the external trigger signal, and synchronizes the vertical synchronizing signal with the TRIGER signal, as shown in FIG. 5B, to start the capturing.

The vertical synchronizing signal VSYNC of the camera 5 is outputted to the confocal scanner unit 4 and the Z-axis scan control device 9. In synchronization with the vertical synchronizing signal VSYNC inputted, the rotation control unit of the confocal scanner unit 4 drives the microlens array and the pinhole array so rotationally as to scan the whole XY-area once for every image pickup periods of the individual video frames.

In synchronization with the vertical synchronizing signal VSYNC inputted, as shown in FIG. 5C, the Z-axis scan control device 9 executes the stage, at which it outputs pulses for the vertical synchronizing signal period, as the movement control signal CNT to the actuator 8. Moreover, the Z-axis scan control device 9 counts the vertical synchronizing signals VSYNC inputted, and stops the pulse output of the movement control signal CNT when a predetermined count is reached. The Z-axis scan control device 9 executes a stage, at which it outputs the reset signal RST to the actuator 8, as shown in FIG. 5D. When the next vertical synchronizing signal VSYNC is inputted, the Z-axis scan control device 9 repeats such a sequence like before for the period of a predetermined number of video frames as is composed of the stage, at which it outputs the pulses for the vertical synchronizing signal period for a predetermined number of video frame periods as the movement control signal CNT to the actuator 8, and the stage, at which it stops the pulse output of the movement control signal CNT for one video frame period and at which it outputs the reset signal RST to the actuator 8.

The actuator 8 integrates the pulses of the movement control signal CNT inputted from the Z-axis scan control device 9, to produce the drive signals which increase for the vertical synchronizing signal period but keep constant values for the image pickup periods of the video frames, as shown in FIGS. 5E and 5F. The objective lens 7 is moved in the Z-direction with those drive signals. Here, the movement of the objective lens 7 is made proportional to the magnitudes of the drive signals.

In response to the reset signal RST from the Z-axis scan control device 9, moreover, the actuator 8 returns the drive signals to the initial value.

By the operations thus far described, the scanning points in the sample 20 and the individual video frames are given such relations as are shown in FIG. 5G. For the individual video frame periods (as indicated by T1 to T8), the images in the XY-plane having a specific Z-coordinate spaced for every video frames are picked up for every video frame periods.

According to the scanning sequence thus far described, the objective lens 7 is moved in the Z-direction only for the image pickup period of the video frames. Therefore, the video frames having picked up the XY-plane of the sample 20 with the fixed Z-coordinate can be created individually for the different Z-coordinates.

As described hereinbefore, the confocal microscope apparatus is enabled to improve the precision of the scanning position control of the sample better in the optical axis direction. Moreover, the confocal microscope apparatus is enabled to enhance the probability of grasping a micro structure in the image picked up. Still moreover, the confocal microscope apparatus is enabled to create the video frames, which are picked up by picking up a plane normal to the optical axis of the sample with the coordinate in the optical axis direction being fixed, individually for the coordinates in the different optical axis directions.

Figure 6:
FIG. 6 shows a display example of a three-dimensional image according to the confocal microscope of the related art.
Figure 7A:
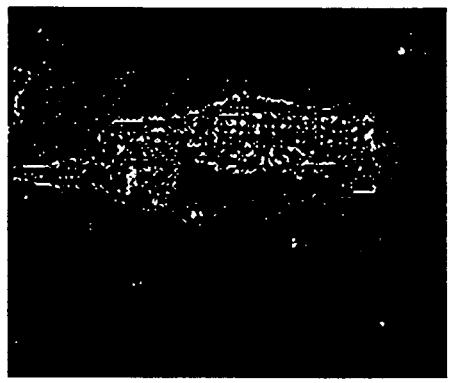
FIGS. 7A to 7D show map display examples of measured images.
Figure 7B:
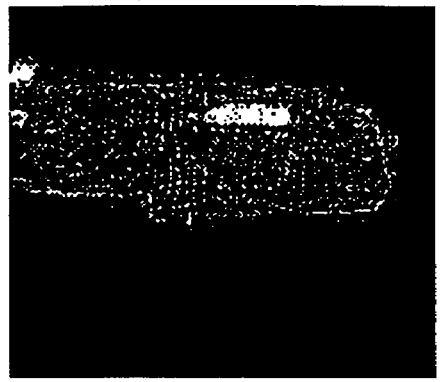
Figure 7C:
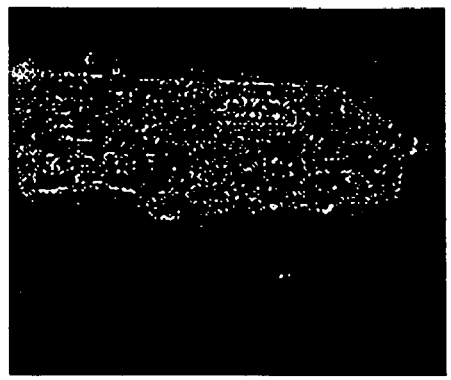
Figure 7D:
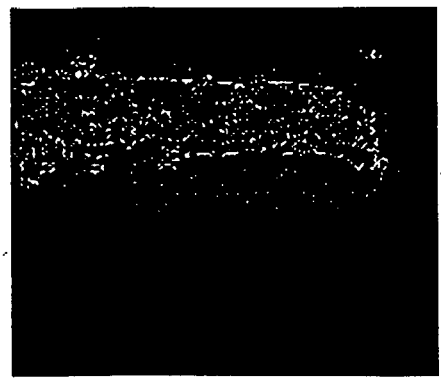

Another embodiment of the invention will be described in the following. In the case a stereoscopic image of the sample is to be attained with the confocal microscope apparatus using the confocal scanner, a number of slice images are obtained at different positions in the optical axis direction, as described above, and are made stereoscopic by the CG (Computer Graphics) technique. FIG. 6 is a display example of the three-dimensional image of a Californian purple sea urchin measured by that method. By this display, the whole image of the sample can be grasped.

However, this case has the following problems.
(1) The CG processing takes time at least several minutes to several hours. This image processing after the CG has to be performed after the measurement. It is difficult to grasp the whole image during the measurement, to decide the propriety of the sample and to select the best portion of measurement.
(2) The shapes in the individual sections cannot be precisely grasped with perspective views. The shapes of the individual sections can be precisely grasped neither too much nor too less by using the two-dimensional images (or the slice images), as shown in FIG. 7. It is, however, difficult to grasp the stereoscopic relations as a whole with those slice images. Here, the slice images of FIGS. 7A, 7B, 7C and 7D correspond to the individual slice images from up to down in the case a cell is placed at the position of the sample. These views are binarized for the convenience of display.

Figure 8:
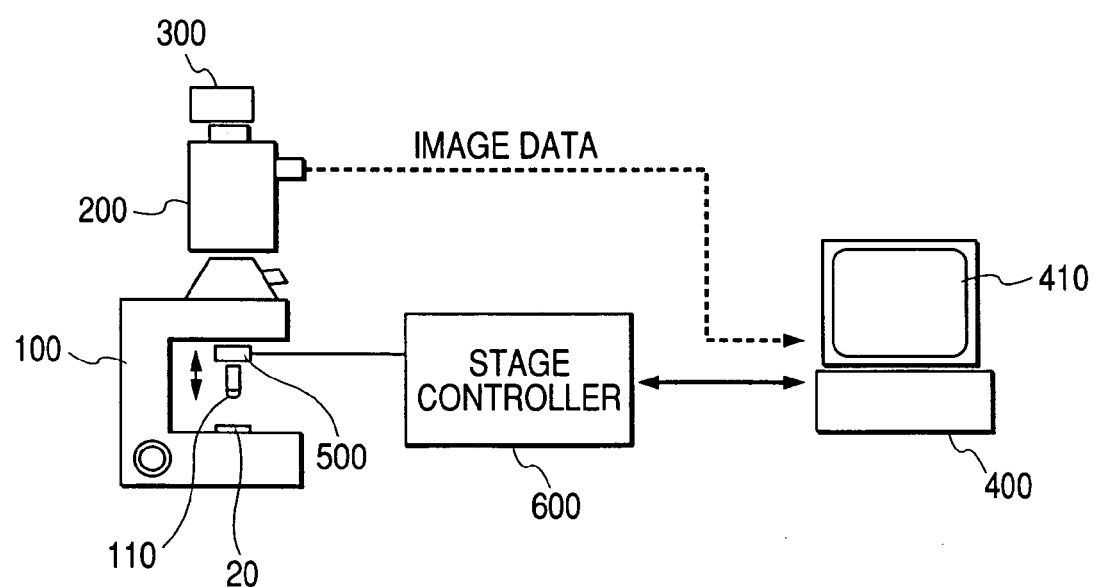
FIG. 8 is a configuration diagram showing another example of the confocal microscope apparatus according to the invention.

FIG. 8 is a diagram of another embodiment of the invention, which has solved those problems. The confocal microscope apparatus of this embodiment is enabled to display a three-dimensional image at a high speed thereby to grasp the whole image while the sample is being measured and to grasp the slice images in the individual sections and their stereoscopic relations precisely in real time.

In FIG. 8: reference numeral 100 designates an optical microscope (as will be called merely the "microscope"); numeral 200 designates a confocal optical scanner disposed at the light receiving portion of the microscope 100; numeral 300 designates an image pickup camera (as will be called merely the "camera") for picking up that image of the sample face, which is obtained through the confocal optical scanner 200; and numeral 400 designates a processing portion.

The processing portion 400 is provided with a display screen 410 and is enabled to read the image data outputted from the camera 300 and subject them to a predetermined processing and to display the image on the display screen 410. A personal computer is usually used as that processing portion 400.

Numeral 500 designates a drive portion for moving an objective lens 110 of the microscope 100 in the optical axis direction. For example, a piezo-element (PZT) is used as the drive portion 500.

Numeral 600 designates a stage controller for controlling the drive portion 500 on the basis of an instruction coming from the processing portion 400.

Here, the components of FIG. 8 and the components of FIG. 2 correspond in the following manners. The optical microscope 100 corresponds to the body portion 1 of FIG. 2; the objective lens 110 corresponds to the objective lens 7 of FIG. 2; the confocal optical scanner 200 corresponds to the confocal scanner unit 4 of FIG. 2; the image pickup camera 300 corresponds to the camera 5 of FIG. 2; the sample 20 corresponds to the sample 20 of FIG. 2; the processing portion 400 corresponds to the image processing device 10 of FIG. 2; the screen 410 corresponds to the display device 11 of FIG. 2; the drive portion 500 corresponds to the actuator of FIG. 2; the stage controller 600 corresponds to the Z-axis scan control device 9 of FIG. 2.

In this configuration, the operations to obtain the slice images of the sample 20 placed on the microscope 100 are identical to those of the confocal microscope apparatus of the related art, and their description is omitted.

While the objective lens 110 is moved in the optical axis direction by activating the drive portion 500, the confocal slice images are picked up at the individual optical axis heights by the camera 300. The processing portion 400 transforms the images (in the top plan view) obtained from the camera 300 into the perspective images (or the corresponding images) picked up obliquely downward, and display them on the screen 410.

These transformations into the perspective views may be made merely by drawing pixels of coordinates Xi and Yi at the plane coordinates Xj and Yj of a predetermined perspective view, so that the transformations can be processed at a high speed.

For images of an inclination of 30 degrees, the coordinates Xj and Yj are determined, for example, on the basis of the following Formulas:

$$Xi = Xj \cos\theta - Yj \sin\theta;$$

$$Yi = Xj \sin\theta - Yj \cos\theta,$$

wherein $\theta = 30°$.

The coordinates Xj and Yj can be determined merely by the product/sum operations, if the processing portion 400 has the cos 30° as the table of constants. The product/sum operations can be processed at high speeds.

Figure 9:
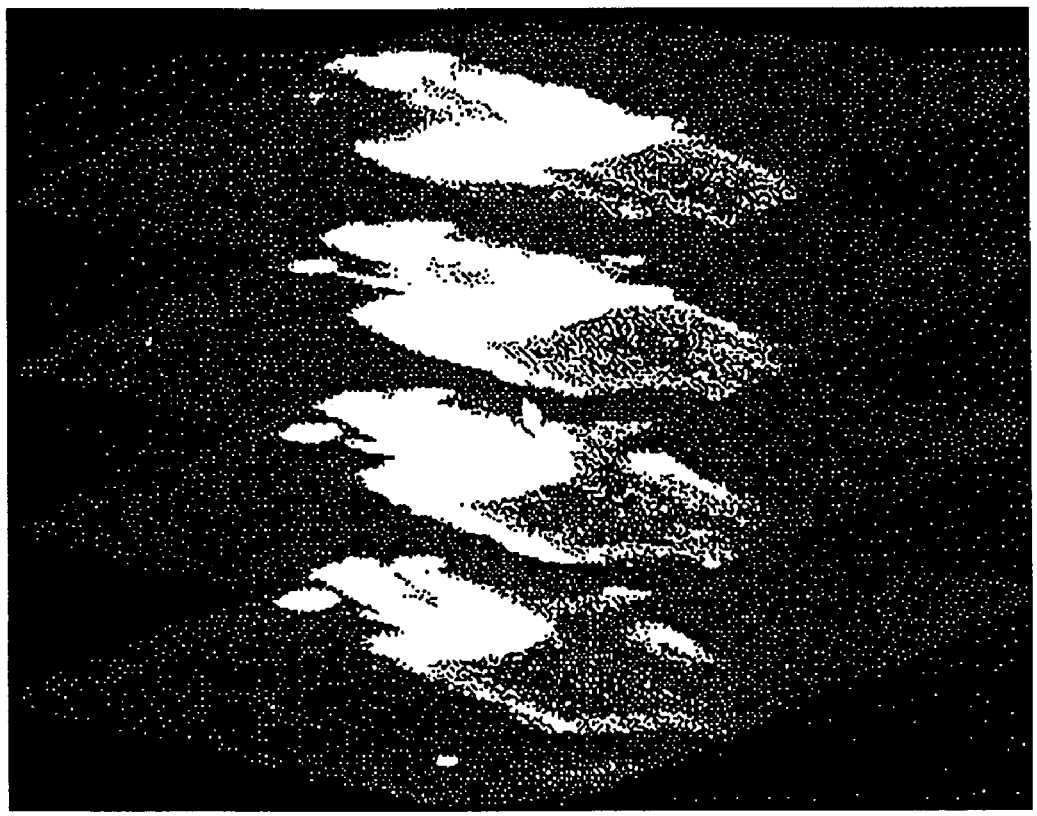
FIG. 9 is a diagram showing a three-dimensional display example having a plurality of slice images.

In the case a plurality of slice images are to be displayed, they are drawn as they are at a spacing in the optical axis direction while being held at their relative positions in the optical axis direction, as shown in FIG. 9. FIG. 9 is an example of the image display of the case, in which the measurement and the display are actually performed in real time.

FIG. 9 shows the motions of calcium ions in the muscle of heart, in which a white bright spot moves from the left depth of the screen to this side. With these four images, it can be intuitively grasped at a glance that the calcium ions spread earlier in the cell of the uppermost slice image than the lowermost slice image. This makes it possible not only to analyze the data after acquired but also either to decide the propriety of what sample is to be actually measured, or to select the best portion of measurement.

Thus, the confocal microscope apparatus of this embodiment can grasp the precise slice images of the sample at the individual optical axis heights and the stereoscopic relations of the samples as a whole.

The invention may be exemplified by the changes/modifications, as will be enumerated in the following.

(1) In the case a plurality of slice images are to be obtained, the XY-plane of the sample may be captured by the aforementioned scanning sequence with the Z-coordinate being fixed.

(2) The number of display sheets should not be limited to four but can be any from two to several tens.

(3) The display angle can be 0 to 360° individually in the longitudinal and latitudinal directions.

(4) For the image display, all the images need not be displayed, but some may be thinned out. For example, the confocal optical scanner can raise the speed up to 1,000 sheets/second, but the display cannot be recognized by the human eyes even if it is made at a speed exceeding a human-recognizable video rate (about 30 sheets/second) In this case, the display of one sheet per 1,000/30=33 (sheets) is sufficient.

(5) Alternatively, the image display need not display all the slice images being measured but may display only a representative image, as shown in FIG. 9. This display method is more advantageous in the high speed and the recognition than the aforementioned display method (3).

Figure 10A:
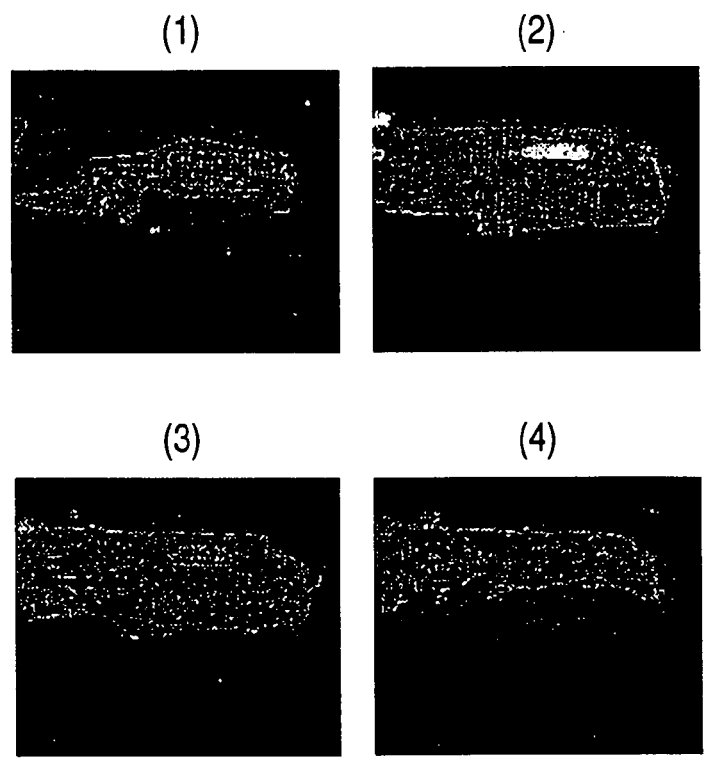
FIGS. 10A and 10B are contrast diagrams of the map display and a perspective display.
Figure 10B:
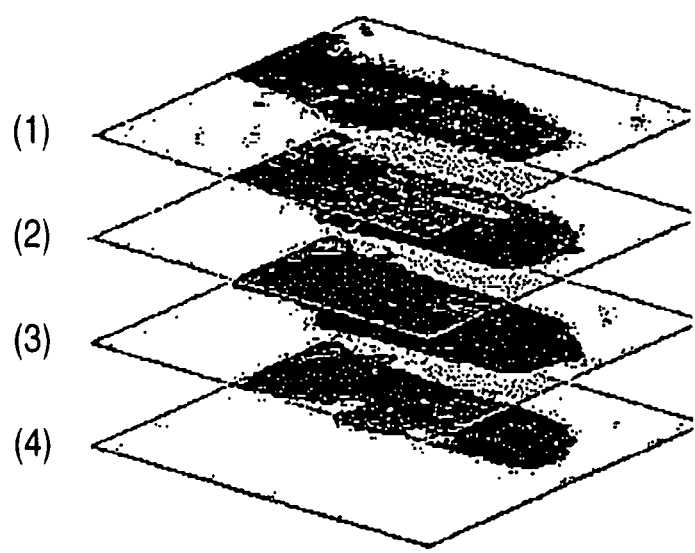

FIGS. 10A and 10B present contrast diagrams of the cases, in which the slice images of Ca ions in the cells of the muscle of heart are displayed in different formats. FIG. 10A presents the map displays shown in FIGS. 7A to 7D, and FIG. 10B presents the display example of the perspective view formats according to the invention. Here, the displays (1) to (4) of FIG. 10A correspond to the displays (1) to (4) of FIG. 10B.

As shown in FIG. 10B, the arrangement is devised to display the slice images on the common screen so that the positions of the slice images relative to the sample can be grasped. Then, it is found that FIG. 10B presents a stereoscopically more recognizable image display than FIG. 10A.

(6) The display image should not be limited to a monochromatic display but may be a multicolor display.

(7) The measurement of sizes and the grasp of shapes are facilitated if known markers such as graduations or circles or known scales are displayed together with the slice images.

(8) Even the map display format shown in FIGS. 7A to 7D can be utilized for deciding the propriety of the sample to some extent although its stereoscopic grasp is difficult, if the display can be made in real time.

(9) The drive of the objective lens 110 should not be limited to that of the piezo-element but may be exemplified by a stage drive or that of a magnetic actuator.

(10) The sample 20 should not be limited to a living organism with a fluorescent light but may be a semiconductor surface or a mechanical part with a reflecting mirror.

(11) A more proper display can be obtained if the angle or number of displays can be changed during the measurement/display.

(12) The image display may be updated for each slice image at any time when the slice image is measured, or the slice images displayed in the display screen may be updated all at once when their measurement was ended.

According to the confocal microscope apparatus of the embodiment shown in the configuration diagram of FIG. 8, as described hereinbefore, the following effects can be obtained.

(1) The three-dimensional display at a high speed can be easily realized to grasp the whole image easily while the sample is being measured.

(2) It is possible to grasp the slice images of the individual sections and their stereoscopic relations precisely.

What is claimed is:

1. A confocal microscope display device comprising:
    a confocal scanner for scanning a sample with shifting a focal position of a light beam in a direction perpendicular to an optical axis;
    a moving mechanism for moving the focal position of the light beam in an optical axis direction;
    a camera for picking up an image of the sample with the light beam, the camera synchronizing with a plurality of pulses of a vertical synchronizing signal;
    a movement control unit for controlling the moving mechanism to move the focal position of the light beam by a predetermined different distance in the optical axis direction for each vertical synchronizing signal of the camera in synchronization with the vertical synchronizing signal; and
    a processing portion for reading the slice images of the sample obtained from the confocal scanner, to display the slice images on a screen,
    wherein while measuring the sample, the processing portion displays two or more slice images in such an arrangement on a common screen that positions of said slice images relative to the sample are enabled to be grasped.

2. The confocal microscope display device according to claim 1,
    wherein the processing portion displays the slice images one-dimensionally or two-dimensionally in such an arrangement that positions of said slice images relative to the sample are enabled to be grasped.

3. The confocal microscope display device according to claim 1,
    wherein the display number of the slice images is enabled to be changed while measuring the sample.

4. The confocal microscope display device according to claim 1,
    wherein the slice images are presented in a perspective view so that the processing portion displays the sample and each of the slice images at coincident relative positions in the optical axis direction.

5. The confocal microscope display device according to claim 1,
    wherein the display angle of the perspective view of the slice images is enabled to be changed while measuring the sample.

6. The confocal microscope display device according to claim 1,
    wherein the processing portion displays sizes, axes, frames or marker images over the slice images.

7. The confocal microscope display device according to claim 1,
    wherein the processing portion includes a personal computer.

* * * * *